United States Patent
Reid et al.

(10) Patent No.: US 11,604,563 B1
(45) Date of Patent: *Mar. 14, 2023

(54) PREDICTIVE ANSWERS BASED ON CONTEXT MODELING

(71) Applicant: Intercom, Inc., San Francisco, CA (US)

(72) Inventors: Fergal Reid, Dublin (IE); Mario Kostelac, Zagreb (HR); Kevin McNally, Dublin (IE)

(73) Assignee: Intercom, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,025

(22) Filed: Aug. 26, 2022

Related U.S. Application Data (63) Continuation of application No. 17/526,914, filed on Nov. 15, 2021, now Pat. No. 11,449,201.

(60) Provisional application No. 63/236,121, filed on Aug. 23, 2021.

(51) Int. Cl.
*G06F 3/0482* (2013.01)
*G06F 16/955* (2019.01)
*G06N 5/04* (2023.01)

(52) U.S. Cl.
CPC ........ *G06F 3/0482* (2013.01); *G06F 16/9566* (2019.01); *G06N 5/04* (2013.01)

(58) Field of Classification Search
CPC ...... G06F 3/0482; G06F 16/9566; G06N 5/04
USPC .......................................................... 706/11
See application file for complete search history.

(56) References Cited

U.S. PATENT DOCUMENTS

| | | |
|---|---|---|
| 8,823,667 B1 | 9/2014 | Hill |
| 9,230,241 B1 | 1/2016 | Singh et al. |
| 10,515,313 B2 | 12/2019 | Kaplow et al. |
| 10,805,465 B1 | 10/2020 | Krebs et al. |
| 11,216,528 B1 | 1/2022 | Porter |
| 11,449,201 B1 * | 9/2022 | Reid ................... G06F 16/9566 |
| 2002/0026516 A1 | 2/2002 | Yoo |
| 2017/0103426 A1 | 4/2017 | Peretz et al. |
| 2018/0025404 A1 | 1/2018 | Harris et al. |
| 2018/0333638 A1 | 11/2018 | Read |
| 2019/0012714 A1 | 1/2019 | Bright |
| 2019/0258818 A1 * | 8/2019 | Yu ........................... G06F 21/31 |
| 2020/0104225 A1 * | 4/2020 | Erickson ............... G06F 9/3836 |
| 2021/0042796 A1 | 2/2021 | Khoury et al. |
| 2021/0134270 A1 | 5/2021 | Rakshit et al. |
| 2021/0136032 A1 | 5/2021 | Kim et al. |
| 2021/0224858 A1 | 7/2021 | Khoury et al. |

* cited by examiner

*Primary Examiner* — William D Titcomb
(74) *Attorney, Agent, or Firm* — Womble Bond Dickinson (US) LLP (57) ABSTRACT

A system and a method of displaying a predictive answer in a conversation window, are described. The method includes transmitting, to a device executing an application, a first message to cause the device to display a conversation window within the application, wherein the conversation window has a character entry field. The method includes generating, by one or more processors, a predictive answer based on a Uniform Resource Locator (URL) associated with the conversation window or a URL shape of the URL, wherein the predictive answer includes a predicted inquiry of a user. The method includes transmitting, to the device, a second message to cause the device to display the predictive answer in the conversation window.

20 Claims, 7 Drawing Sheets

| URL SHAPE | PREDICTIVE ANSWER | CONFIDENCE SCORE |
|---|---|---|
| HTTPS://APP.INTERCOM.COM/A/APPS/\W+/ACCOUNT | CHANGE EMAIL ADDRESS | 0.44 |
| | CHANGE TEAMMATE NAME | 0.44 |
| HTTPS://APP.INTERCOM.COM/A/APPS/\W+/ACCOUNT/ACCOUNT_ACCESS | ADD A TEAMMATE | 0.05 |
| HTTPS://APP.INTERCOM.COM/A/APPS/\W+/ACCOUNT/NOTIFICATIONS | MANAGE NOTIFICATIONS | 0.35 |
| HTTPS://APP.INTERCOM.COM/A/APPS/\W+/ACCOUNT/VISIBILITY/TAGS | ARCHIVE TAGS | 0.10 |
| HTTPS://APP.INTERCOM.COM/A/APPS/\W+/ACCOUNT/VISIBILITY/USER-SEGMENTS | EDIT/DELETE A SEGMENT | 0.42 |

# PREDICTIVE ANSWERS BASED ON CONTEXT MODELING

CROSS-REFERENCE TO RELATED APPLICATIONS

This application is a continuation of U.S. application Ser. No. 17/526,914, filed Nov. 15, 2021, which claims the benefit of priority of U.S. Provisional Patent Application No. 63/236,121, filed on Aug. 23, 2021, which is incorporated herein by reference in its entirety to provide continuity of disclosure.

TECHNICAL FIELD

The present disclosure relates to systems and methods for managing communications and, more specifically, systems and methods for managing communications with users and potential users of a system.

BACKGROUND

Customer relationship management (CRM) software is software that automates and manages interactions with an organization. A conversational messaging system may allow an organization to define conversational experiences for commerce, marketing, and support using in-product channels (e.g., chatbots, live messaging, banners) and out of product channels (e.g., email, short message service (SMS) messages). CRM software or conversational messaging systems may be used by an organization to maintain contact with customers and quickly respond to their needs. CRM software or conversational messaging systems may be used by an organization to increase engagement with the organization.

SUMMARY

This disclosure relates to a system and a method of displaying a predictive answer in a conversation window, e.g., within a webpage. In an embodiment, a computer system, e.g., a client computing device and/or a server computing device, includes one or more processors configured to perform a method including displaying, e.g., within a webpage, a conversation window having an input field, such as a character entry field. The character entry field can be blank when the conversation window is initiated. That is, there may be no character(s) entered in the character entry field.

The computer system can determine whether a current context of the device matches a predetermined device context. The current context can be defined at least partly by a Uniform Resource Locator (URL) of the webpage. For example, a URL shape of the webpage URL can define the current context, and the URL shape can be matched to a predetermined URL shape to determine whether the current context matches the predetermined device context.

In response to determining that the current context matches the predetermined device context, a predictive answer can be determined. The predictive answer can be mapped to the predetermined device context in a context model. For example, the context model can be stored in a memory of the computer system and can include a listing of URL shapes and corresponding predictive answers based on historical data. The historical data can include automated answers that were selected by users in previous sessions when the users landed on the webpage. The context model can also map the predictive answers to confidence scores that define a likelihood that the predictive answer will be helpful to a user who has landed on the URL (that the user will select the predictive answer).

The predictive answer can be sent to an end user device for display within the webpage. The end user device can display the predictive answer prior to receiving entry of a character in the character entry field. Accordingly, the predictive answer can infer an inquiry of the user prior to the user revealing or inputting the inquiry to the computer system. The end user can select the predictive answer, and the user selection can be detected by the computer system. In response, the computer system can display, in the conversation window, an answer that corresponds to the predictive answer. Accordingly, the predictive answer can infer an inquiry that the user may then confirm to obtain a corresponding answer and start a conversation.

Further, to the extent consistent, any of the embodiments or aspects described herein may be used in conjunction with any or all of the other embodiments or aspects described herein.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements.

As used herein, the term "communication system" may refer to the system and/or program that manages communications between individuals and companies. The term "customer" may refer to a company or organization utilizing the communication system to manage relationships with its end users or potential end users (leads). The term "user" may refer to an end user or lead that is interfacing with the customer through the communication system. The term "company" may refer to an organization or business that includes a group of users. The term "engineer" may refer to staff managing or programming the communication system.

As described in the below passages, the communication system may place (e.g., assign, allocate) users into user paths developed by the customers and monitor interaction of the users with the customers. The communication system may monitor and/or detect the interaction of the user with the customers and interact with the users to advance the users along the user paths based on conditions set by the customer. The interactions with the users may include, but not be limited to, chats, instant messages, text messages, and emails. The communication system may include reporting functions that allow a customer to monitor the status of users along the developed user paths.

Figure 1:
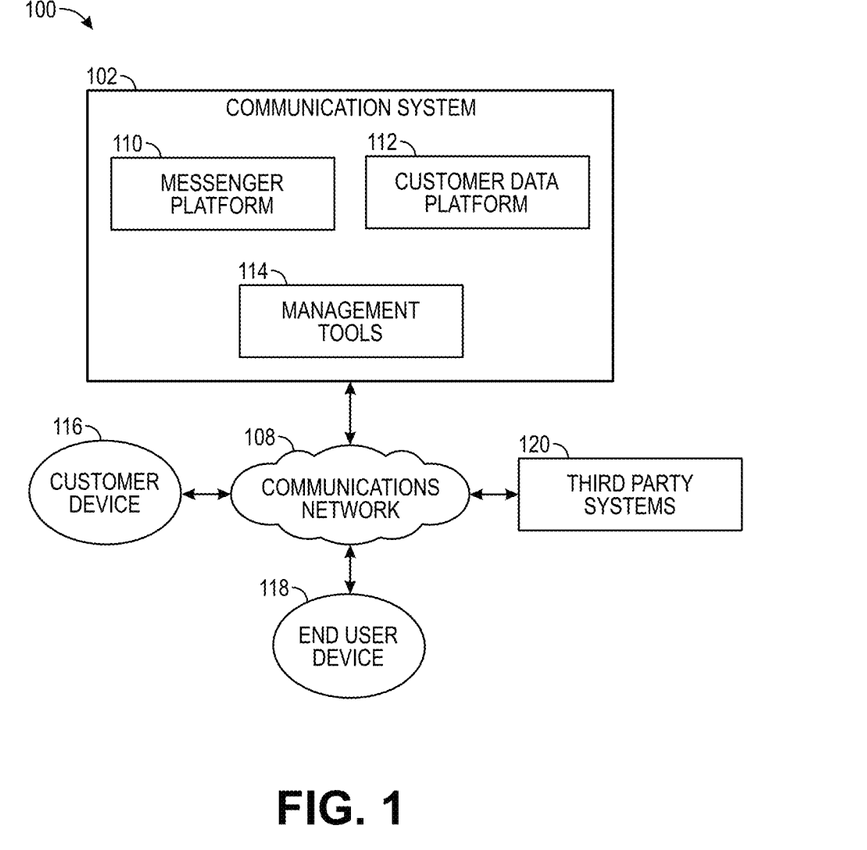
FIG. 1 is a block diagram of an example environment for managing communications with users and potential users of a communication system, according to some embodiments.

FIG. 1 is a block diagram depicting an example environment for managing communications with users and potential users of a communication system, according to some embodiments. As shown, the environment 100 includes a communication system 102 that is interconnected with one or more customer devices 116, one or more end user devices 118, and one or more third party systems 120 via a communications network 108. The communications network 108 may be the internet, a wide area network (WAN), intranet, or other suitable network. The communication system 102 may be hosted on one or more local servers, may be a cloud based system, or may be a hybrid system with local servers and in the cloud. The communication system 102 is maintained by engineers which develop management tools 114 that include an interface or editor for clients of the communication system 102 to interface with the communication system 102.

The communication system 102 includes management tools 114 that are developed to allow customers to develop user series or user paths in the form of nodes and edges (e.g., connections) that are stored in a customer data platform 112 of the communication system 102. The communication system 102 includes a messenger platform 110 that interacts with end user devices 118 in accordance with the user paths stored in the customer data platform 112.

A customer interacts with the communication system 102 by accessing a customer device 116. The customer device 116 may be a general purpose computer or a mobile device. The customer device 116 allows a customer to access the management tools 114 to develop the user paths stored in the customer data platform 112. For example, the customer device 116 may execute an application using its hardware (e.g., a processor, a memory) to send a request to the communication system 102 for access to a graphical editor, which is an application programming interface (API) stored in the management tools 114. In response to receiving the request, the communication system 102 may send a software package (e.g., executable code, interpreted code, programming instructions, libraries, hooks, data, etc.) to the customer device 116 to cause the customer device 116 to execute the software package using its hardware (e.g., processor, memory). In some embodiments, the application may be a desktop or mobile application, or a web application (e.g., browser). The customer device 116 may utilize the graphical editor to build the user paths within the graphical editor. The graphical editor may periodically send copies (e.g., snapshots) of the user path as it is being built to the communication system 102, which in turn, may store the user paths to the customer data platform 112. The user paths manage communication of the customer with a user to advance the user through the user paths. The user paths may be developed to increase engagement of a user with the customer via the messenger platform 110.

The messenger platform 110 may interact with a user through an end user device 118 that accesses the communications network 108. The end user device 118 may be a general purpose computer or mobile device that accesses the communication network 108 via any network, including the internet or a mobile network. The user may interact with the customer via a website of the customer, a messaging service, or interactive chat. In some embodiments, the user paths may allow a customer to interface with users through mobile networks via messaging or direct phone calls. In some embodiments, a customer may develop a user path in which the communication system 102 interfaces with a user device via a non-conversational channel such as email.

The communication system 102 includes programs or workers that place users into the user paths developed by the customers stored in the customer data platform 112. The communication system 102 may monitor progress of the users through the user paths developed by the customer and interact with the customer based on the nodes and edges developed by the customer for each user path. In some embodiments, the communication system 102 may remove users from user paths based on conditions developed by the customer or by the communication system 102.

The communication system 102 and/or the customers may employ third party systems 120 to receive (e.g., retrieve, obtain, acquire), update, or manipulate (e.g., modify, adjust) the customer data platform 112 or user data which is stored in the customer data platform 112. For example, a customer may utilize a third party system 120 to have a client chat directly with a user or may utilize a bot (e.g., a software program that performs automated, repetitive, and/or predefined tasks) to interact with a user via chat or messaging.

Although FIG. 1 shows only a select number of computing devices and/or systems (e.g., communication system 102, customer device 116, third party systems 120, and end user device 118), the environment 100 may include any number of computing devices and/or systems that are interconnected in any arrangement to facilitate the exchange of data between the computing devices and/or systems.

Figure 2:
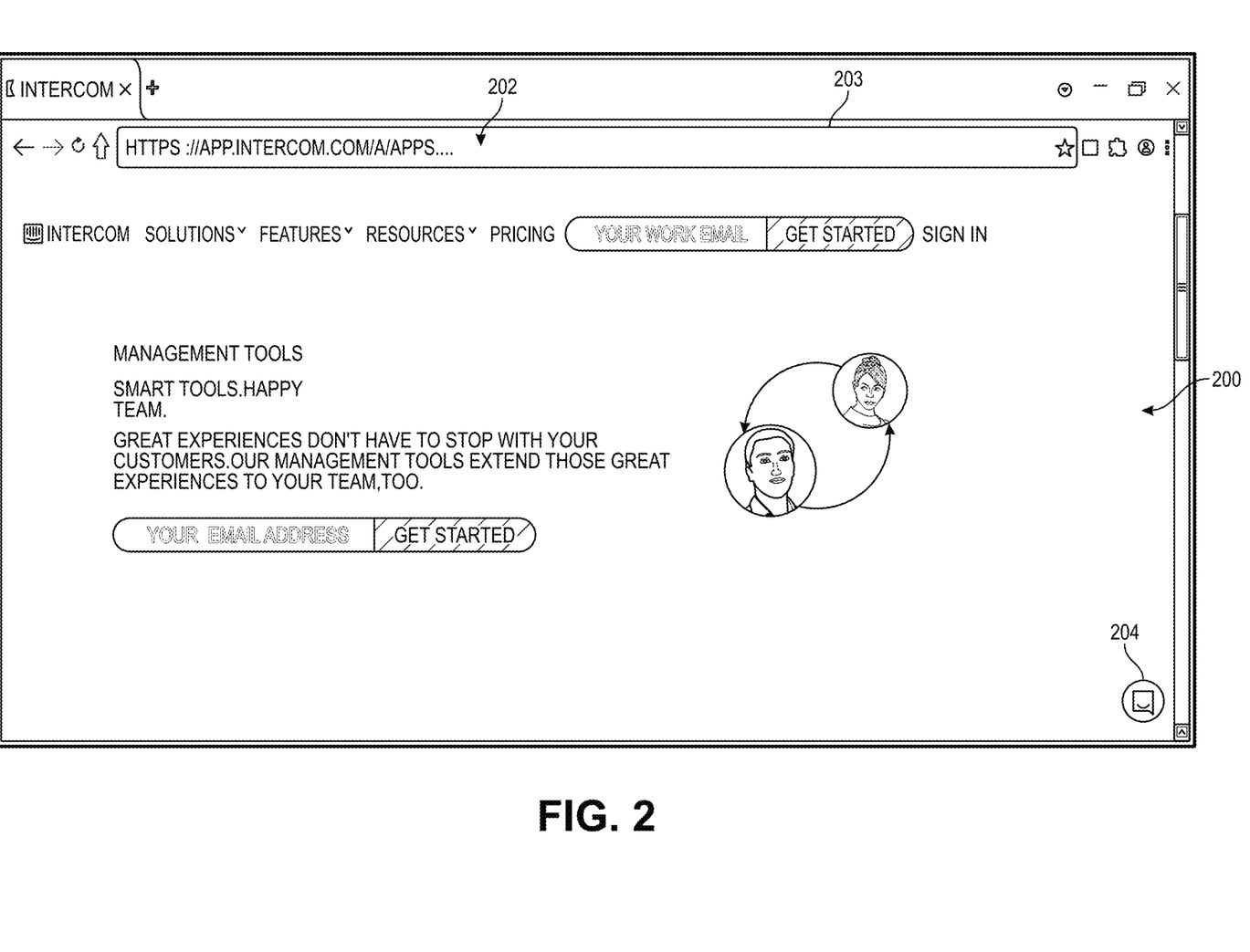
FIG. 2 is a pictorial view of a webpage being displayed on a display of a device, in accordance with an embodiment.

Referring to FIG. 2, a pictorial view of a webpage being displayed on a display of a device is shown in accordance with an embodiment. One of the end user devices 118 can display a webpage 200 when a user of the end user device 118 lands on the webpage while browsing the internet. For example, the end user device 118 can receive entry of a Uniform Resources Locator (URL) 202 in a web browser, and the web browser may retrieve content from a web server, e.g., from one of the third party systems 120, and display the content as the webpage 200. Entry of the URL 202 may be made directly in an address bar 203 of the web browser, or alternatively, entry may be made indirectly, e.g., when the user selects a hyperlink displayed in a search engine result page by the web browser.

In an embodiment, the webpage 200 includes a messenger interface element 204. The messenger interface element 204 may be displayed as an icon, e.g., on a corner of the webpage 200. The messenger interface element 204 may be selectable by the user, e.g., by tapping or clicking on the icon. For example, when the user wants to interface with the messenger platform 110, the user can select the messenger interface element 204 to initiate an interaction with the messenger platform 110. The user may have an inquiry that can be answered by the messenger platform 110.

Figure 3:
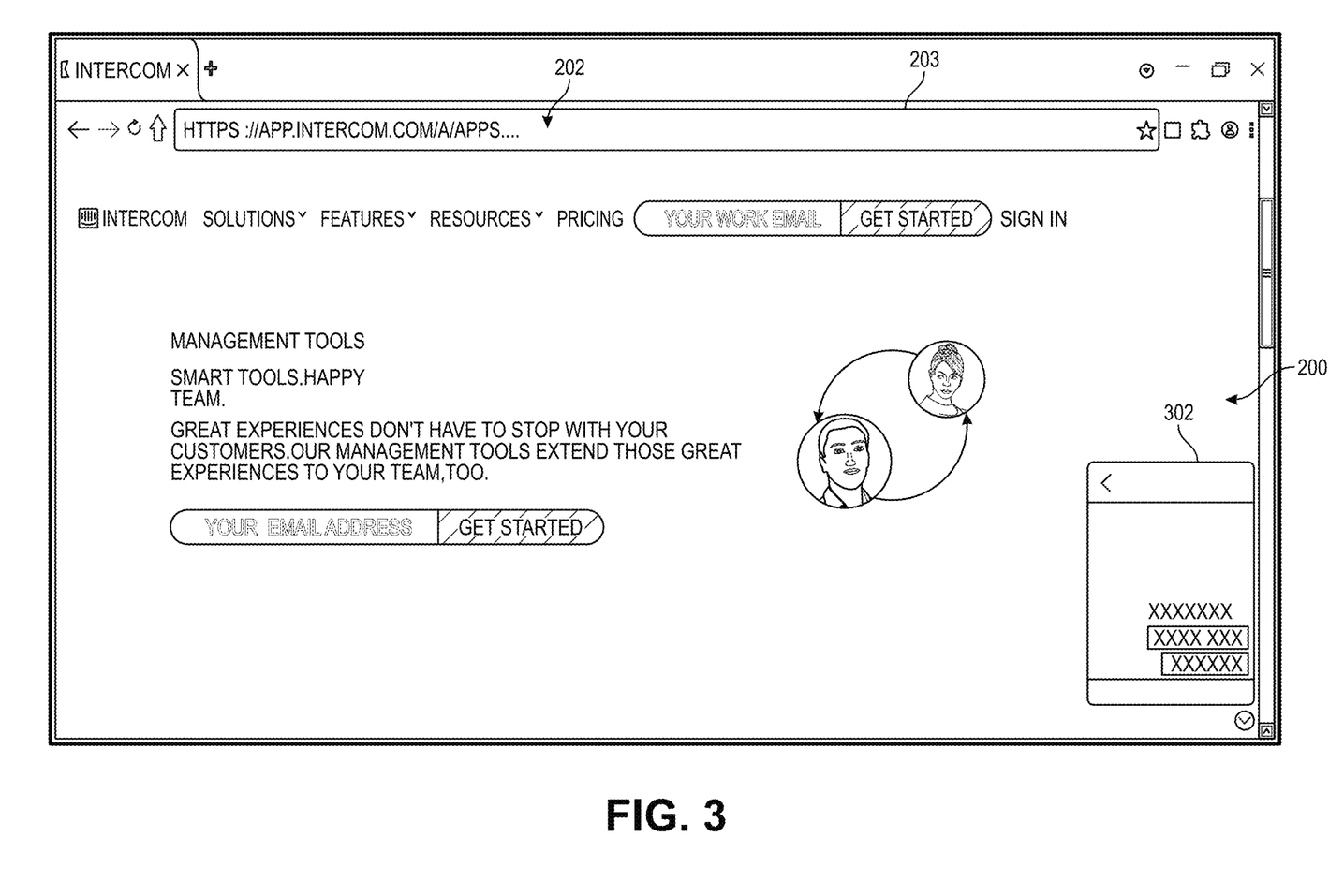
FIG. 3 is a pictorial view of a conversation window being displayed within a webpage on a display of a device, in accordance with an embodiment.

Referring to FIG. 3, a pictorial view of a conversation window being displayed within a webpage on a display of a device is shown in accordance with an embodiment. To obtain an answer to their inquiry, the user can select the messenger interface element 204. In response to the selection, the messenger platform 110 can open a conversation. More particularly, a conversation window 302 can be displayed within the webpage 200 to allow the user to interface with the messenger platform 110. The conversation window 302 provides the interface through which answers to the inquiry of the user may be presented to the user. The answer(s) can be presented in response to a direct input of the inquiry by the user, e.g., via a text or voice input. Alternatively, as described below, the answer can be presented by inferring the inquiry of the user based on a context of the end user device 118 when the conversation is initiated, e.g., when the messenger interface element 204 is selected.

Figure 4:
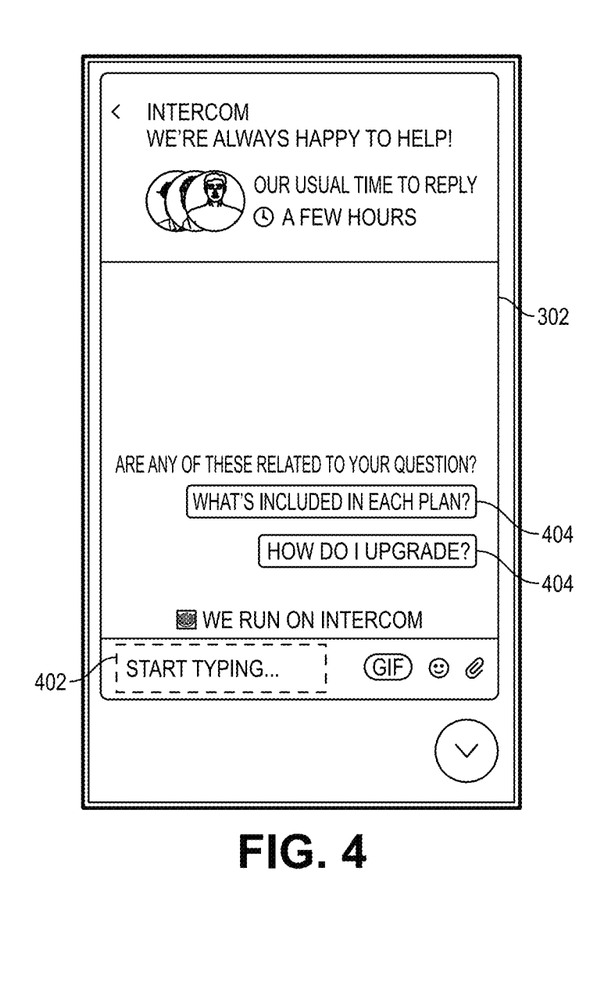
FIG. 4 is a pictorial view of a conversation window having a predictive answer displayed in a conversation window when no character has been entered into a character entry field, in accordance with an embodiment.

Referring to FIG. 4, a pictorial view of a conversation window having a predictive answer displayed in a conversation window when no character has been entered into a character entry field is shown in accordance with an embodiment. The conversation window 302 includes an input field, e.g., a character entry field 402, to receive the input of the user inquiry. The input field can receive and support the receipt of images, Graphics Interface Format (GIF) files, and other attachments, such as voice notes, etc. Accordingly, while the description focuses primarily on character entry within the character entry field 402, it will be appreciated that the input field can receive and support other data entries. In an embodiment, the messenger platform 110 recognizes the inquiry and provide automated answers to the inquiry. It will be appreciated that such automated answers can be provided without requiring the time and expense associated with human customer support.

In an embodiment, the automated answers can be provided by an inbound bot that is loaded with the messenger platform 110 when the end user initiates the conversation window 302. The inbound bot may be, for example, a custom bot that is programmed by the customer device 116 to provide specific answers useful to the use of the customer's webpage 200 by the end user. The answers provided by the inbound bot can be specified by the customer using a decision tree-based methodology that is particular to the customer needs. For example, in the conversation window 302 illustrated in FIG. 4, the customer may have programmed an inbound bot to display "How do I upgrade?" within the conversation window 302 when the conversation window 302 is opened and prior to entry of any characters in the character entry field 402. When available to the customer, the inbound bot targeted at the URL 202 of the webpage 200 may take precedence over other automated answer methodologies. However, the other automated answer methodologies can include predictive answers 404, as described below, which may present an automated answer when no inbound bot is available for the webpage 200. To avoid confusion, the automated answer shown in FIG. 4 may be provided by an inbound bot, or may be predicted answers 404 surfaced by the communication system 102, as described below. Accordingly, when the conversation window 302 is opened, an automated answer provided by an inbound bot may be displayed, or alternatively, in response to no inbound bot being unavailable for the webpage 200, the method of displaying a predictive answer 404 in the conversation window 302 within the webpage 200 may be initiated.

In an embodiment, one or more predictive answers 404 are displayed in the conversation window 302 prior to receiving entry of a character in the character entry field 402. Predictive answers 404 can be provided by a resolution bot of the messenger platform 110. When enabled, the resolution bot can determine whether the end user is likely to ask certain questions, based on a current context of the end user device 118, and present automated answer suggestions in the conversation window 302. As described below, the current context of the end user device 118 can be defined by the URL 202 of the webpage 200 and/or other user metadata. The automated answer suggestions, which are inferred by the resolution bot based on the current context of the end user device 118, are referred to as predictive answers 404.

The predictive answers 404 can be displayed in the conversation window 302 as soon as the conversation window 302 is opened. For example, in the conversation window 302, although no character is typed into the character entry field 402, the resolution bot can display one or more predictive answers 404, including "What's included in each plan?" and "How do I upgrade?." The predictive answers 404 may be considered titles to answers, rather than answers themselves. In this paradigm, for example, "How do I upgrade?" can be a predictive answer 404 that is a title to the answer "You can upgrade by selecting this link." Thus, it will be appreciated that predictive answers 404 presented to the user through the conversation window 302 are user interface elements that predict the inquiry of the user before the user has revealed the inquiry to the system.

The user interface elements providing the predictive answers 404 can be selectable by the user. For example, the predictive answers 404 may be presented as buttons within the conversation window 302, which may be selected by the user to cause the display of the answer corresponding to the predictive answer 404. Thus, in the example, provided above, the user can select the title to the answer "How do I upgrade?," and in response to the selection, the messenger application can present, in the conversation window, "You can upgrade by selecting this link."

The inbound bot, which provides custom answers, and the resolution bot, which provides predictive answers 404, can be enabled or disabled by the customer device 116. The customer device 116 can use the graphical editor to access a bot settings interface that allows customer teammates to configure answers provided by bots. For example, the bot settings interface can be used to configure the custom answers provided by the inbound bot and/or the predictive answers 404 provided by the resolution bot. The operator settings interface can include a check box, toggle, or other user interface element that enables or disables the inbound bot or resolution bot. The user interface element can indicate, e.g., by an accompanying label, that enabling the feature will cause the messenger application to suggest answers before customers start typing in a conversation window 302. The feature can be enabled/disabled on a user group or per user basis. For example, the user interface element, when enabled, can provide predictive answers 404 to end users grouped as visitors/leads that access the webpage 200, or to end users grouped as users that access the webpage 200. Similarly, the user interface element can enable predictive answers 404 on a per-user basis, e.g., for each individual independently. Accordingly, customers can selectively tune the end user experience.

Figure 5:
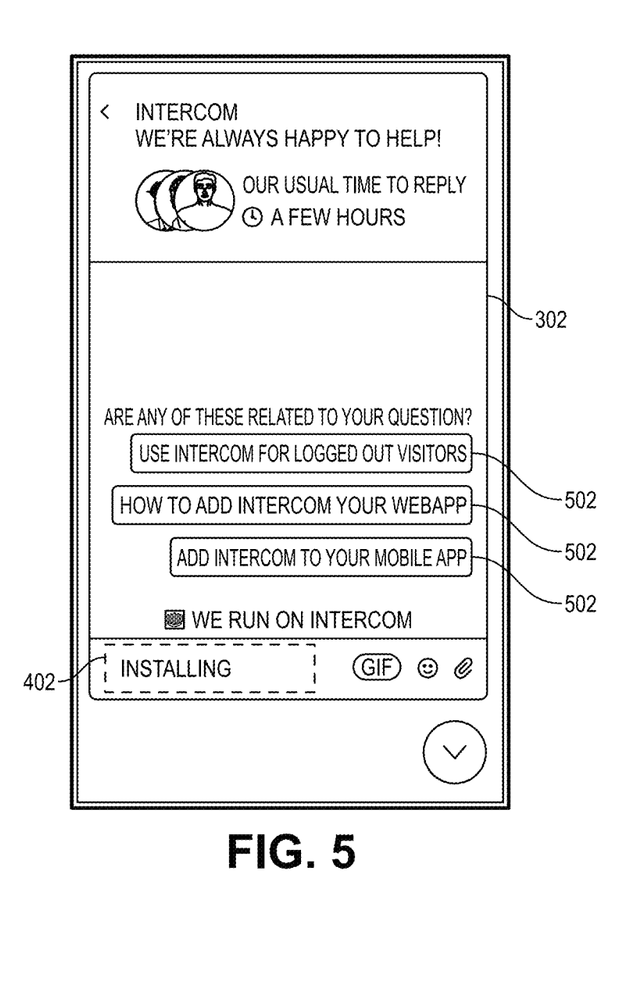
FIG. 5 is a pictorial view of a conversation window having an automatically suggested answer displayed in a conversation window when a character has been entered into a character entry field, in accordance with an embodiment.

Referring to FIG. 5, a pictorial view of a conversation window having an automatically suggested answer displayed in a conversation window when a character has been entered into a character entry field is shown in accordance with an embodiment. In an embodiment, the graphical editor also allows teammates using the customer device 116 to configure automated suggestions 502 that appear in response to characters entered in the character entry field 402. Like the predictive answers 404, the automated suggestions 502 can be enabled/disabled through the operator settings interface to selectively tune the end user experience.

When automated suggestions 502 are enabled, an automated suggestion bot of the messenger application can show specific suggestions based on input received within the character entry field 402. For example, in the conversation window 302 illustrated in FIG. 5, the end user has typed "installing" into the character entry field 402 and, in response to the characters, the messenger platform 110 has provided several automated suggestions 502 related to the input, e.g., "Add Intercom to your mobile app." The automated suggestions 502 are responsive to the inquiry entered by the end user, and thus, are not predictive answers 404 inferred from a context, e.g., a current URL 202 of the end user device 118. More particularly, rather than being inferred from such context, the automated suggestions 502 are answers determined based on user inputs, e.g., characters typed in a composer of the conversation window 302.

In an embodiment, a transition from the inbound bot and/or resolution bot to the automated suggestion bot may occur only when matching suggested answers exist for the entered character string. For example, when the end user starts typing, but there are no matching suggested answers, the custom answers provided by the inbound bot or the predictive answers 404 provided by the resolution bot can remain in view. Thus, if the user has entered the first three characters of the term "installing," i.e., "ins," the predictive answers 404 of FIG. 4 may remain in view if the automated suggestions 502 of FIG. 5 are not mapped to "ins" by the messenger platform 110. On the other hand, if "ins" is mapped to the automated suggestions 502 of FIG. 5, then the inbound bot and/or resolution bot will transition to the automated suggestion bot, and the suggested answer match will be shown instead of the predictive answers 404.

In an embodiment, a transition from the inbound bot and/or resolution bot to the automated suggestion bot is reversible. For example, after entering text into the character entry field 402 that yields the automated suggestions 502 of FIG. 5, the end user may delete the text to cause the automated suggestion bot to transition to the resolution bot. The conversation window 302 can revert to show predictive answers 404, as shown in FIG. 4. The reversal may occur when the text string remaining in the character entry field 402 no longer maps to a suggested answer. In such event, the resolution bot can provide predictive answer(s) 404 based on the current context. Accordingly, the messenger platform 110 can revert to providing answers based on a user's context, e.g., a URL the user is on, instead of using entered text to map to an answer.

Having described the framework for custom answers, predictive answers 404, and suggested answers that may be presented to the user by the end user device 118, the predictive answer methodology shall now be described in more detail. In particular, a method of determining predictive answers 404 for display in the conversation window 302 is described.

As described above, predictive answers 404 may be determined based on a current context of the end user device 118 as the current context exists when the webpage 200 is displayed by the web browser and/or when the conversation window 302 is opened in the webpage 200. For example, the current context may exist when the URL 202 is entered into the web browser for retrieval of the webpage 200 from the third party systems 120.

In an embodiment, the current context is at least partly defined by the URL 202 of the webpage 200. The current context, however, may be partly defined by other data, such as by user metadata. By way of example, the user metadata can include: a URL of another webpage or web site that the web browser has navigated from to arrive at the current webpage 200; data attributes describing a status of the customer or the end user, e.g., whether the customer or the end user has subscribed to predictive answers; whether the end user is an original or returning user; etc. These examples are illustrative, and not limiting, and indicate that the current context of the end user device 118 may be defined solely or partly by the URL 202.

The current context may be used to determine a predictive answer 404 based on a context model stored by the communication system 102 and/or third party systems 120. In an embodiment, the communication system 102 generates the context model based on historical data gathered from prior interactions between end user devices 118 and conversation windows displayed within the webpage 200. The context model can map the URL 202 (or a shape of the URL 202, as described below), which defines the current context of the end user devices 118 when the prior interactions occurred, to an array of answers that were served to the end user devices 118 and found to be helpful during the prior interactions. Whether the answers are found to be helpful can be based on a statistical measure that end users visiting the webpage 200 selected the answers when served in the prior interactions. Accordingly, the historical data can be used to predict a statistical likelihood that end user visiting the webpage 200 will select particular answer(s) when those answers are served in future interactions. The context model that correlates the input of URLs and/or URL shapes to the output of helpful (predictive) answers can be built using automated machine learning model generation techniques. More particularly, such an automated machine learning model can use URLs as the context to predict answers.

In an embodiment, the context model is generated according to a method that gathers and analyzes historical data to build a model that provides the variables in the statement "if a user is on a given URL there is an X % chance that they will be looking for answer Y." The method can include collecting data from several conversations within which the inbound bot or the automated suggestion bot provided an answer to an end user inquiry on a web site. In an operation, the URLs on which the conversation was started can be mapped to an answer that was provided in the conversation. For example, the URLs can be mapped to the last answer provided in the conversation or to an answer that the end user selected in the conversation.

In an operation, the URLs are grouped based on their shape. Here, a URL shape refers to URL paths, or portions of URL paths, that make semantic sense. For example, the URL shape can be a condensed path that includes a portion of a full path name and/or one or more regular expressions found within the full path name. The URL shape can include only a portion of the path of the URL. An example of this is the URL "https://app.intercom.com/a/apps/%3A %2F %2/account," which can be condensed into the corresponding URL shape "https://app.intercom.com/a/apps\\w+/account." This example URL shape can include one or more of a static portion of the URL, a dynamic portion of the URL, and a portion that replaces a regular expression found in the URL ("\\w+"). Accordingly, the URL shape corresponds to the URL, but is not necessarily the URL itself. Entry of the URL shape into the address bar of the web browser may not return the webpage 200 identified by the URL 202. It will be appreciated, however, that in some instances the URL shape may happen to be the original raw URL, and thus, the examples of URL shapes provided are illustrative and not limiting.

After collecting the conversation data and determining the URL shapes, the data can be pivoted to provide a per path picture. More particularly, the model generation process can determine how many times each answer was provided on each URL shape. Based on the frequency that the answers were provided on each URL shape, a probability distribution can be generated. The probability distribution can be used to determine a confidence score, e.g., a lower confidence bound, for each answer. Furthermore, simple thresholding and a threshold can be used to make per-URL shape suggestions of all answers that meet the threshold.

Optionally, the context model can take advantage of the natural tree structure of URLs, which implies that an answer that is helpful when the end user lands on a URL having a leaf node will also be helpful when the end user lands on a URL having a branch node. For example, a same predictive answer 404 can be recommended for the URLs "intercom.com/visibility/user-segments" and "intercom.com/visibility."

Figure 6:
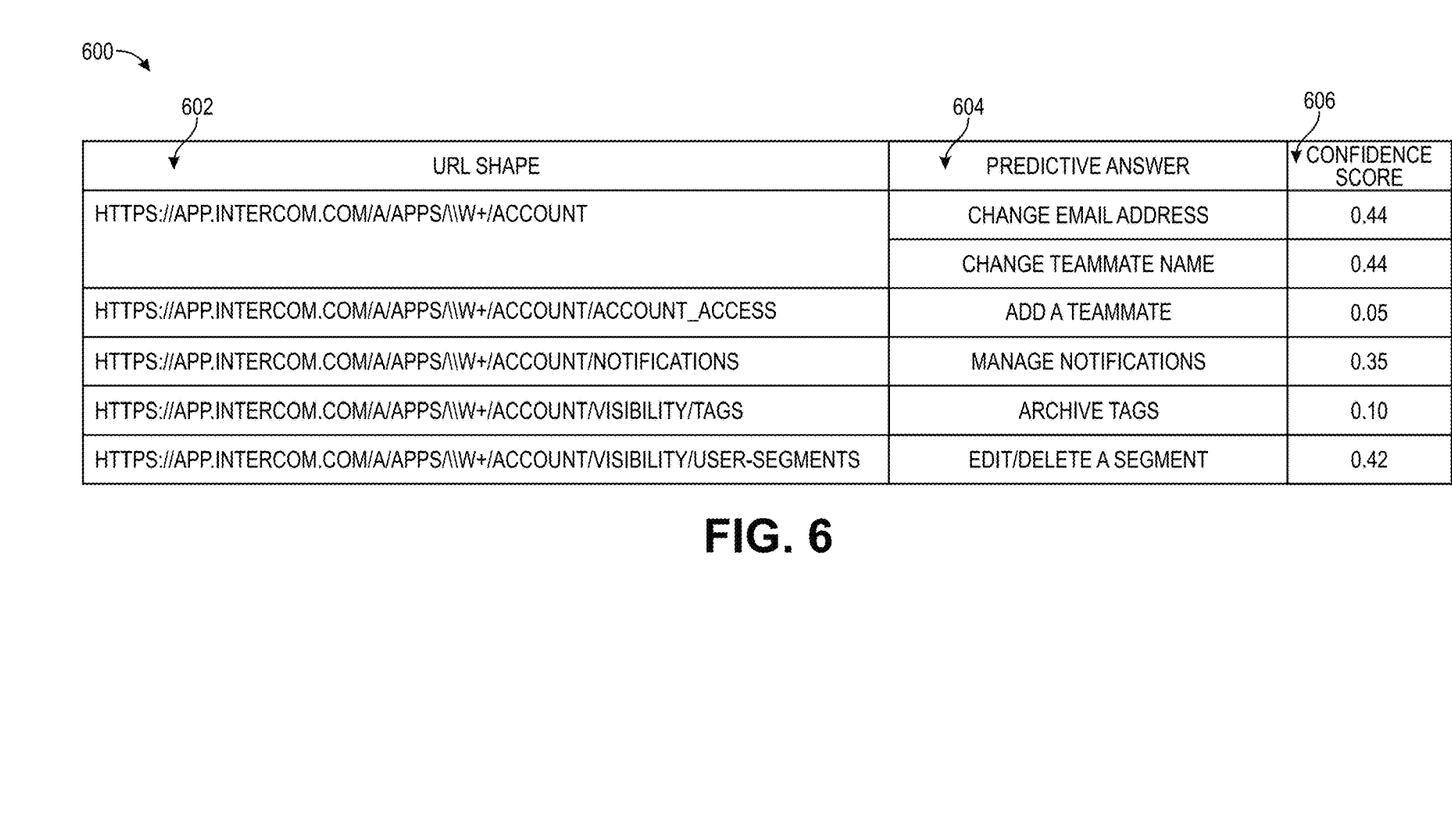
FIG. 6 is a table representing a context model mapping a URL shape to a predictive answer, in accordance with an embodiment.

Referring to FIG. 6, a table representing a context model mapping a URL shape to a predictive answer is shown in accordance with an embodiment. The context model 600 generated by the communication system 102 can be stored as a data object that includes URL shape values 602 and predictive answer values 604, together with their confidence score values 606. The confidence score values 606 can be the lower confidence bound of a confidence interval that the predictive answer 404 will be selected when it is served for display in the conversation window 302 within a webpage 200 having the URL shape. The use of the context model 600 is described further below in the context of a method of using the context model 600 to determine and display a predictive answer 404 in the conversation window 302 within the webpage 200.

It will be appreciated that a single URL can have more than one predictive answer 404 associated with the URL shape, and that a predictive answer 404 can be predicated in several different URLs. For example, the URL shape in the top row of the context model 600 of FIG. 6 is associated with two predictive answers 404 having values 604 of "Change email address" and "Change teammate name," respectively.

The context model 600 is statistically generated from historical data, and thus, the usefulness of predictive answers 404 depends in part on an amount of data that is available to construct the model from. More particularly, a minimum number of prior interactions with the web site and/or any particular URL 202 may be required before a correlation between URL shape and predictive answers 404 may be reliably made. In an embodiment, a support tool can be used by the communication system 102 to set the minimum number and to otherwise view and edit the context model 600 to accurately target customer needs.

The context model 600 can be regularly updated by the communication system 102. For example, the communication system 102 can run the model generation process daily, weekly, etc. In an embodiment, the model generation process is run once per day for all customers that have at least one conversation resulting in an automated answer.

Figure 7:
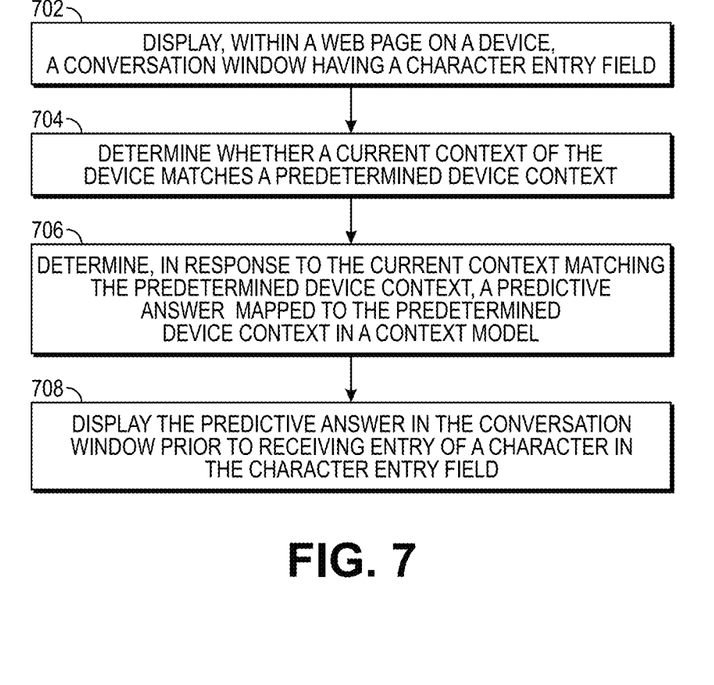
FIG. 7 is a flowchart of a method of determining and displaying a predictive answer in a conversation window within a webpage, in accordance with an embodiment.

Referring to FIG. 7, a flowchart of a method of determining and displaying a predictive answer in a conversation window within a webpage is shown in accordance with an embodiment. The customer device 116 can enable a website to provide predictive answers 404 to an end user. When the end user device 118 accesses the website, e.g., via a URL 202, the website can load the messenger application that allows the end user device 118 to connect to the communication system 102 via the internet. Accordingly, the method of determining and displaying predictive answers 404 can be implemented between the end user client device and the communication system 102 server, which together form part of a computer system. When the end user client device accesses the website and loads the messenger application, the client device can request a ruleset from the communication system 102. The ruleset can be a data object that includes URL shapes from the context model 600 that correspond to the website. For example, when the web browser of the end user device 118 navigates to "app.intercom.com," the communication system 102 can provide a ruleset to the end user device 118 containing the URL shapes illustrated in FIG. 6.

At operation 702, the computer system, e.g., the end user device 118 of the computer system, can display, within the webpage 200, the conversation window 302 having the character entry field 402. For example, when the user selects the messenger interface element 204, the conversation window 302 can open to start a conversation.

At operation 704, the computer system can determine whether a current context of the end user device 118 matches a predetermined device context. The determination can be made in response to receiving an entry of the URL 202 (directly or indirectly), in response to a change from one URL to another URL 202, at a predetermined time interval, etc.

As described above, the current context can be at least partly defined by the URL 202 of the webpage 200. For example, the URL shape can include a portion of a path of the URL 202. The portion can be one or more static and/or dynamic portions of the URL 202, and may also include a regular expression. In an embodiment, the portion of the path includes a leaf node. The predetermined device context can include a predetermine URL shape, such as the URL shapes stored in the context model 600. The computer system can determine whether the URL shape matches the predetermined URL shape.

Matching of the URL shape of the URL 202 against the predetermined URL shape can occur at one or more of the end user device 118 or the communication system 102. More particularly, operation 704 can be performed at one or both of the end user device 118 or the communication system 102. In an embodiment, the end user device 118 stores the ruleset containing predetermined URL shapes from the context model 600. The end user device 118 can periodically, e.g., each time the web browser navigates to a new URL 202, compare the URL shape (the current context) to the ruleset (defining the predetermined device contexts). The end user device 118 can therefore determine whether the URL shape of the URL 202 matches a predetermined URL shape. When a match is determined, e.g., when portions of the current URL 202 match corresponding portions of the path in the predetermined URLs of the ruleset, the end user device 118 can query the communication system 102 server to request confirmation of the match and provision of any corresponding predictive answers 404. Accordingly, the end user device 118 can send, in response to the URL shape matching the predetermined URL shape, a request for a predictive answer 404.

Instead of or in addition to the matching performed by the client device, the communication system 102 may also match the URL shape of the URL 202 against the predetermined URL shape. When the end user device 118 calls the communication system 102, it can send data defining the current context of the end user device 118. For example, the request to the communication system 102 can include the URL 202 and/or the URL shape, as well as any other user metadata relevant to defining the current context. The communication system 102 can receive the data defining the current context, and in response, can perform URL shape matching against the context model 600 to determine whether the current context of the end user device 118 matches a predetermined device context.

At operation 706, when the server determines that a match between the current context and a predetermined device context exists, the communication system 102 can determine a predictive answer 404 that may be helpful to the user visiting the URL 202. The communication system 102 can determine the predictive answer 404 based on the current context of the end user device 118. For example, the communication system 102 can identify the predictive answer(s) 404 that are mapped to the predetermined device context in the context model 600 that is stored on the communication system 102. More particularly, one or more of the predictive answer values 604 that correspond to the predetermined URL shape values 602 matching the current context can be identified.

The communication system 102 may also determine the confidence scores that match the identified predictive answers 404. In the above example, when the current URL 202 of the end user device 118 is "https://app.intercom.com/a/apps/%3A %2F %2/account," the communication system 102 can match the URL 202 to the URL shape in the top row of FIG. 6 and identify the predictive answers "Change email address" and "Change teammate name" having the confidence scores 0.44 and 0.44, respectively.

The communication system 102 can send the identified predictive answer(s) 404 for display on the end user device 118 in response to the end user query. Provision of the predictive answers 404 can, however, be filtered. For example, a maximum number of predictive answers 404 may be provided from the predictive answers 404 that are surfaced. In an embodiment, a maximum of three predictive answers 404 are sent to the end user for display. Limiting the predictive answers 404 displayed to the user can avoid overwhelming the user and provide a positive user experience. The predictive answers 404 served to the end user device 118 can be based on the corresponding confidence scores. For example, the predictive answers 404 with the highest confidence scores can be sent, and they may also be sent in order based on their confidence score, e.g., highest score to lowest score.

The communication system 102 may also filter predictive answers 404 based on whether the end user device 118 is eligible to receive one or more of the predictive answers 404. In an embodiment, a predictive answer 404 should only be surfaced and/or sent if the end user device 118 or user meets predetermined audience targeting parameters. The customer may use the settings interface to define certain users that are eligible to receive certain predictive answers 404. For example, the customer may not want a particular user to be helped with the process of changing an email address, and thus, may exclude that predictive answer 404 in FIG. 6 from being provided to the end user device 118. The inclusion/exclusion of predictive answers 404 can be made through toggles, check boxes, etc. that configure particular users to receive particular predictive answers 404. Accordingly, the communication system 102 can send predictive answers 404 to the end user device 118 based both on context matching as well as user eligibility. Accordingly, the computer system can determine whether the end user device 118 is in a target audience, and send the predictive answer 404 in response to determine that the end user device 118 is in the target audience.

In an embodiment, the communication system 102 send the confidence score(s) associated with the predictive answer(s) 404 to the end user device 118. The end user device 118 can user the confidence scores to determine whether and how to display the predictive answers 404 in the conversation window 302. For example, the end user device 118 may receive all of the predictive answers 404 available for a current context, but may display only the predictive answers 404 that have a confidence score above a predetermined threshold. Similarly, the end user device 118 may receive the predictive answers 404 as an array having predictive answers 404 paired to confidence scores, and the end user device 118 may arrange the predictive answers 404 for display in an order based on the confidence scores (predicted most helpful to predicted least helpful).

The end user device 118 can receive the predictive answer 404 (or predictive answers 404), which is based on the current context of the end user device 118. At operation 708, the end user device displays the predictive answer 404 in the conversation window 302. Display of predictive answers 404 can occur prior to receiving entry of a character in the character entry field 402 of the conversation window 302. Accordingly, the predictive answer 404 may infer the inquiry of the user from the current context without receiving an input of the inquiry.

In an embodiment, the user may decide to interact with the predictive answers 404, e.g., by tapping or clicking on the displayed predictive answers 404. The end user device 118 can detect the user selection of the predictive answer 404, and in response, may display an answer in the conversation window 302. As described above, the answer can be information that corresponds to the inquiry presented by the predictive answer 404. In an embodiment, the information is the start of a new conversation. The new conversation can be managed, for example, by the automated suggestion bot to handle the flow of the conversation and provide the user with automated user support.

Figure 8:
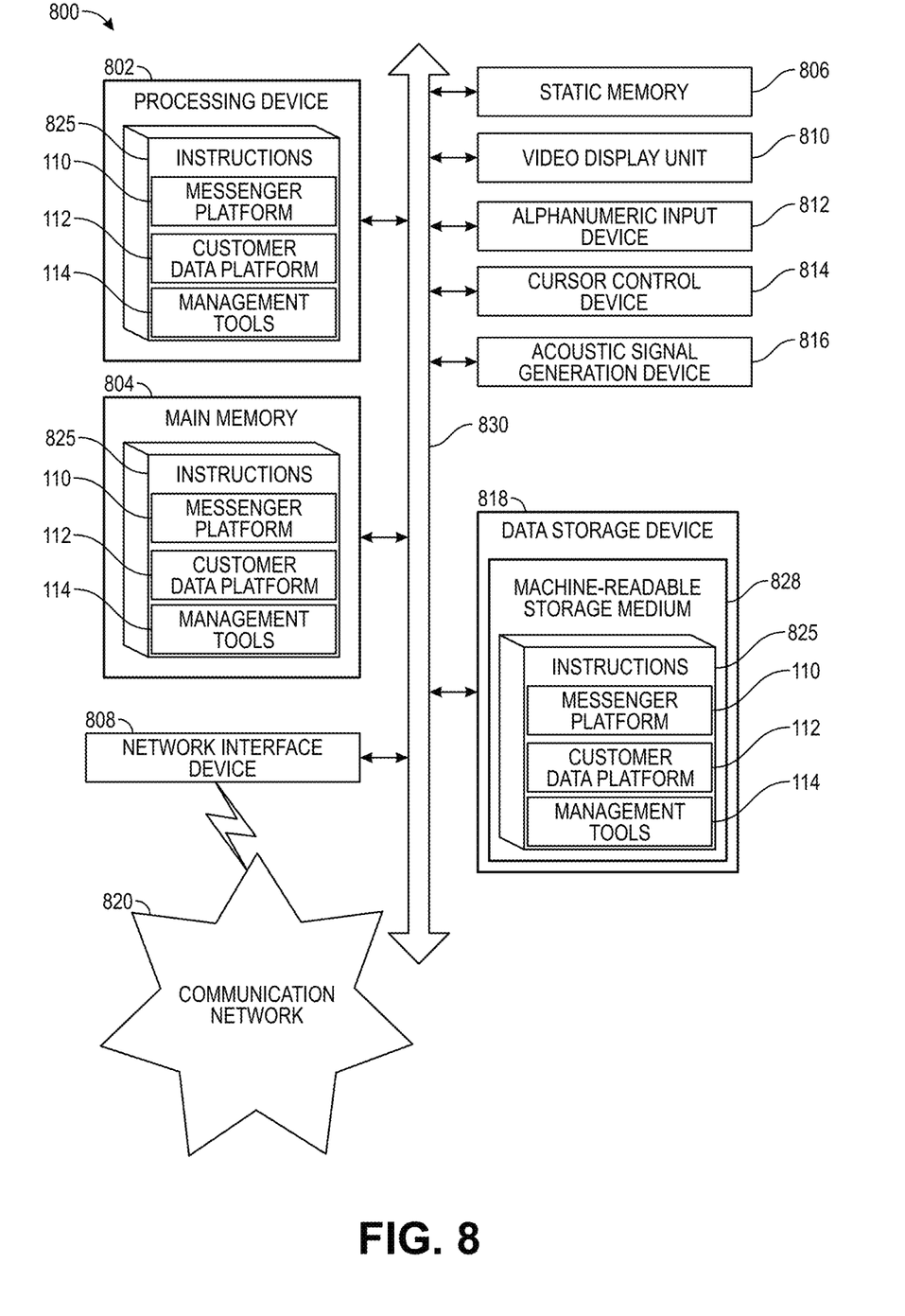
FIG. 8 is a block diagram of an example computing device that may perform one or more of the operations described herein, according to some embodiments.

FIG. 8 is a block diagram of an example computing device that may perform one or more of the operations described herein, in accordance with some embodiments. Computing device 800 may be connected to other computing devices in a LAN, an intranet, an extranet, and/or the Internet. The computing device may operate in the capacity of a server machine or a client machine in a client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. In some embodiments, while only a single computing device is illustrated, the term "computing device" may be taken to include any collection of computing devices that individually or jointly execute a set (or multiple sets) of instructions to perform the methods discussed herein.

The example computing device 800 may include a processing device (e.g., a general purpose processor, a PLD, etc.) 802, a main memory 804 (e.g., synchronous dynamic random access memory (DRAM), read-only memory (ROM)), a static memory 806 (e.g., flash memory and a data storage device 818), which may communicate with each other via a bus 830.

Processing device 802 may be provided by one or more general-purpose processing devices such as a microprocessor, central processing unit, or the like. In an illustrative example, processing device 802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may comprise one or more special-purpose processing devices such as an application specific integrated circuit (ASIC), a field programmable gate array (FPGA), a digital signal processor (DSP), network processor, or the like. The processing device 802 may be configured to execute the operations described herein, in accordance with one or more aspects of the present disclosure, for performing the operations and steps discussed herein.

Computing device 800 may include a network interface device 808 which may communicate with a communication network 820. The computing device 800 may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of instructions 825 that may include instructions for one or more components (e.g., messenger platform 110, the customer data platform 112, and the management tools 114) for carrying out the operations described herein, in accordance with one or more aspects of the present disclosure. Instructions 825 may reside, completely or at least partially, within main memory 804 and/or within processing device 802 during execution thereof by computing device 800, main memory 804 and processing device 802 constituting computer-readable media. The instructions 825 may be transmitted or received over a communication network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" may be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Examples described herein may relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. The terms "comprises", "comprising", "includes", and/or "including", when used herein, may specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

In some embodiments, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method, comprising:
   transmitting, to a device executing an application, a first message to cause the device to display a conversation window within the application, wherein the conversation window has a character entry field;
   generating, by one or more processors, a predictive answer based on a Uniform Resource Locator (URL) associated with the conversation window or a URL shape of the URL, wherein the predictive answer includes a predicted inquiry of a user; and
   transmitting, to the device, a second message to cause the device to display the predictive answer in the conversation window.

2. The method of claim 1, further comprising:
   determining, by the one or more processors, whether the URL shape of the URL matches a predetermined URL shape; and
   generating, by the one or more processors, the predictive answer in response to the URL shape matching the predetermined URL shape, a request for the predictive answer.

3. The method of claim 2, wherein the URL shape includes only a portion of a path of the URL.

4. The method of claim 3, wherein the portion of the path includes a leaf node of the URL.

5. The method of claim 1, wherein transmitting, to the device, the second message to cause the device to display the predictive answer in the conversation window is prior to the device receiving entry of a character in the character entry field.

6. The method of claim 1, further comprising:
   detecting a user selection of the predictive answer; and
   transmitting, in response to detecting the user selection, a third message to cause the device to display an answer in the conversation window.

7. The method of claim 6, wherein the answer corresponds to the predictive answer.

8. A system comprising:
   a memory; and
   a processing device, operatively coupled to the memory, to:
   transmit, to a device executing an application, a first message to cause the device to display a conversation window within the application, wherein the conversation window has a character entry field;
   generate a predictive answer based on a Uniform Resource Locator (URL) associated with the conversation window or a URL shape of the URL, wherein the predictive answer includes a predicted inquiry of a user; and
   transmit, to the device, a second message to cause the device to display the predictive answer in the conversation window.

9. The system of claim 8, wherein the processing device further to:
   determine whether the URL shape of the URL matches a predetermined URL shape; and
   generate the predictive answer in response to the URL shape matching the predetermined URL shape, a request for the predictive answer.

10. The system of claim 9, wherein the URL shape includes only a portion of a path of the URL.

11. The system of claim 10, wherein the portion of the path includes a leaf node of the URL.

12. The system of claim 8, wherein to transmit, to the device, the second message to cause the device to display the predictive answer in the conversation window is prior to the device receiving entry of a character in the character entry field.

13. The system of claim 8, wherein the processing device further to:
   detect a user selection of the predictive answer; and
   transmit, in response to detecting the user selection, a third message to cause the device to display an answer in the conversation window.

14. The system of claim 13, wherein the answer corresponds to the predictive answer.

15. A non-transitory computer-readable medium storing instructions that, when execute by a processing device, cause the processing device to:
   transmit, to a device executing an application, a first message to cause the device to display a conversation window within the application, wherein the conversation window has a character entry field;
   generate, by the processing device, a predictive answer based on a Uniform Resource Locator (URL) associated with the conversation window or a URL shape of the URL, wherein the predictive answer includes a predicted inquiry of a user; and
   transmit, to the device, a second message to cause the device to display the predictive answer in the conversation window.

16. The non-transitory computer-readable medium of claim 15, wherein the instructions, when executed by a processing device, further cause the processing device to:
   determine whether the URL shape of the URL matches a predetermined URL shape; and generate the predictive answer in response to the URL shape matching the predetermined URL shape, a request for the predictive answer.

17. The non-transitory computer-readable medium of claim 16, wherein the URL shape includes only a portion of a path of the URL.

18. The non-transitory computer-readable medium of claim 17, wherein the portion of the path includes a leaf node of the URL.

19. The non-transitory computer-readable medium of claim 15, wherein to transmit, to the device, the second message to cause the device to display the predictive answer in the conversation window is prior to the device receiving entry of a character in the character entry field.

20. The non-transitory computer-readable medium of claim 19, wherein the instructions, when executed by a processing device, further cause the processing device to:
   detect a user selection of the predictive answer; and
   transmit, in response to detecting the user selection, a third message to cause the device to display an answer in the conversation window, wherein the answer corresponds to the predictive answer.

\* \* \* \* \*